United States Patent [19]

Shinohara

[11] Patent Number: 5,606,376
[45] Date of Patent: Feb. 25, 1997

[54] DIFFERENTIAL MOTION DETECTION METHOD USING BACKGROUND IMAGE

[75] Inventor: Toshiaki Shinohara, Omiya, Japan

[73] Assignee: Matsushita Electric Industrial Co., Ltd., Tokyo, Japan

[21] Appl. No.: 460,795

[22] Filed: Jun. 2, 1995

[30] Foreign Application Priority Data

Jun. 8, 1994 [JP] Japan ............................ 6-126486

[51] Int. Cl.$^6$ ............................ H04N 5/272; H04N 1/41
[52] U.S. Cl. ............................ 348/701; 348/19
[58] Field of Search ............................ 348/699, 700, 348/701, 416, 17, 18, 19

[56] References Cited

U.S. PATENT DOCUMENTS

| | | | |
|---|---|---|---|
| 4,823,184 | 4/1989 | Belmares-Sarabia et al. | 358/27 |
| 5,208,673 | 5/1993 | Boyce | 358/167 |
| 5,301,019 | 4/1994 | Citta | 348/416 |
| 5,339,104 | 8/1994 | Hong | 348/155 |
| 5,406,501 | 4/1995 | Florent | 364/516 |
| 5,497,203 | 3/1996 | Kayashima et al. | 348/699 |
| 5,539,469 | 7/1996 | Jung | 348/413 |

FOREIGN PATENT DOCUMENTS

| | | |
|---|---|---|
| 0224253 | 6/1987 | European Pat. Off. . |
| 62-114064 | 5/1987 | Japan . |
| 647174A | 1/1989 | Japan . |
| 404345382 | 12/1992 | Japan . |
| 405257196 | 10/1993 | Japan . |

OTHER PUBLICATIONS

I-Sheng Tang, et al, "Extraction of Moving Objects in Dynamic Scenes", Proceedings of the 6th International Conference on Pattern Recognition, Munich, Oct. 20–22, 1982; IEEE, New York, NY, U.S., pp. 1143–1146.

Patent Abstracts of Japan, vol. 13, No. 172 (P–862) 24 Apr. 1989 & JP–A–10 007174 (Mitsubishi Electric Corporation) 11 Jan. 1989.

*Primary Examiner*—Tommy P. Chin
*Assistant Examiner*—David R. Vincent
*Attorney, Agent, or Firm*—Watson Cole Stevens Davis, P.L.L.C.

[57] ABSTRACT

A differential/absolute value image is derived by calculating an absolute value of each pixel in an image produced by subtracting a background image from an input image. A mean value and a variance of a pixel in the differential/absolute value image are calculated from the levels of pixels included in a small region on the differential/absolute value image which has the pixel located at the center thereof. The calculated mean value and variance of the pixel are used to distinguish whether the pixel is a pixel included in a moving object existing region, a background region, or an input image sudden change region. A method of updating the background image is changed in accordance with whether the pixel is a pixel included in the moving object existing region, the background region, or the input image sudden change region.

5 Claims, 8 Drawing Sheets

FIG.2
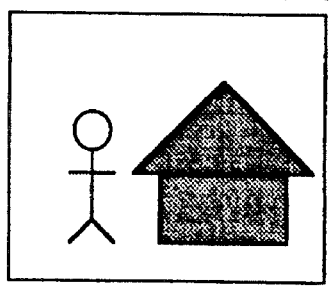
INPUT IMAGE I (i, j)
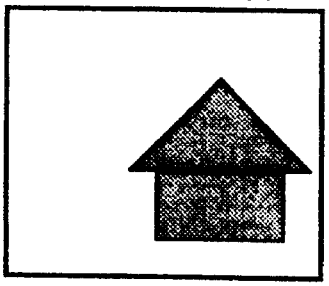
BACKGROUND IMAGE B (i, j)
DIFFERENTIAL / ABSOLUTE VALUE →
DIFFERENTIAL / ABSOLUTE VALUE IMAGE D (i, j)
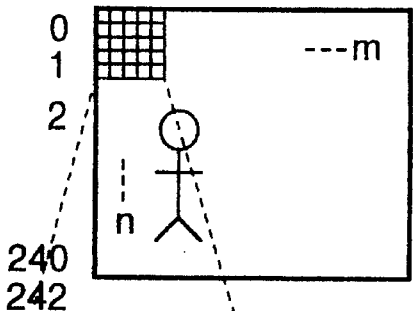
b×b BLOCK
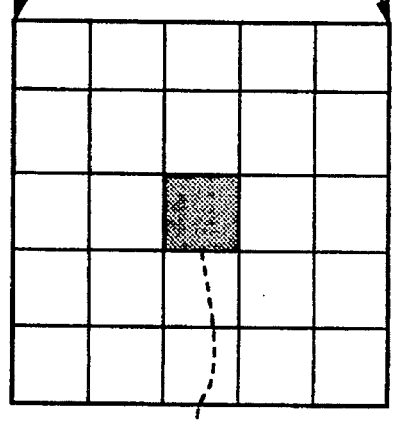
$D(i+i_b, j+j_b)$

DIFFERENTIAL MOTION DETECTION METHOD USING BACKGROUND IMAGE

BACKGROUND OF THE INVENTION

1. Field of the Invention

The present invention relates to a differential motion detection method using background image, and more particularly a motion detection method for detecting a moving object in an image utilizing digital image processing in order to control the operation of an image processing system.

2. Description of the Related Art

Techniques for detecting a moving object (travelling object) in the field of monitoring may be roughly classified into an inter-frame differential method which calculates a differential between frames, a corresponding point calculation method which calculates corresponding points in respective image portions of sequential images, a background differential method which calculates a differential between a background image and an input image, and so on.

Although the inter-frame differential method is simple in structure since it only calculates a differential between two images, a region obtained as a result of the differential calculation does not represent a target object itself, so that it is difficult to detect an image of a moving object, i.e., the target object only from the result of the differential calculation.

The corresponding point calculation method divides an image into small regions, calculates shape parameters characterizing the respective small regions, and correlates the shape parameters between images to calculate corresponding points in these images. Thus, the processing required by this method is so heavy that the detection of corresponding points encounters difficulties when an image includes a rotating object or an object which transforms its shape, since the shape parameters for the respective small regions frequently vary.

The background differential method assumes that an input image includes an image portion of an object (moving object) to be detected and a background image portion, and obtains the image of the object to be detected by subtracting the background image portion from the input image. This method provides favorable detection of a target object if a correct background image is defined. For this purpose, it can be thought to previously capture a background image without a target object. However, since a change in the background image will result in incorrect detection, a method of producing a background image portion plays an important role in the background differential method.

JP-A-62-114064 shows an approach for setting uniform integration parameters to a region subjected to motion detection processing in an image for the current background differential method. This approach represents an updated background image by the following equation (1):

$$B(n)=A \cdot I(n)+(1-A) \cdot B(n-1) \qquad (1)$$

wherein I(n) is an input image, B(n−1) is a previous background image, and A is called a background integration parameter. The background integration parameter is a constant and common to all pixels. This approach, however, has a problem that a hole, a tail, and so on may be produced in a detected region to cause deformation of the detected region depending on a moving speed of an object to be detected, reflectivity of the surface of the object, and a used threshold value.

Background image updating methods include a method which employs a differential/absolute value image D(i, j) between an input image I(i, j) and a background image B(i, j), sets "0" to all the integration parameters A(i, j) in the equation (1), and replaces the background image with the input image (JP-A-1-7174), and a method which uses the reciprocals of absolute values of differential values as the integration parameters A(i, j). Either of the methods replaces the background image with the input image when an absolute value of a differential value is smaller than a threshold value, or smaller integration parameters are set to increase the degree of the replacement.

In the above-mentioned conventional techniques, however, when a moving object having a small absolute value of a differential value enters an input image, a background image is replaced with the input image, whereby the region of the moving object is included in the background image as noise. In view of updating the background image, it is desirable that the background image is not replaced with the region of the moving object.

Further, although the background differential method is said to be resistant to fluctuations in a background image, this is only in the case of slow fluctuations in an input image caused by a changing magnitude of sunlight, automatic gain control (AGC) of a camera, changes in aperture, and so on. However, when a sudden change occurs in an input image due to lightning, switching on or off of illumination, and so on, erroneous detection may result depending on a threshold value set for binary coding and to the values of the background integration parameters A(i, j).

SUMMARY OF THE INVENTION

It is an object of the present invention to provide a differential motion detection method using background image which is capable of realizing the following items (a)–(d) in order to solve the above-mentioned problems inherent to the prior art:

(a) detecting that a sudden change has occurred in an input image from the input image and a background image, and detecting the region in which the sudden change has occurred;

(b) distinguishing a region in which a moving object enters and a region of a background;

(c) updating the background image so as to avoid influences by a moving object entering the input image; and (d) updating the background image so as not to erroneously detect a sudden change in the input image.

Here, although the background image means an image which is obtained according to the above equation (1), the background image may be an image the pixel values of which are "0" the input image itself, or an image without any moving objects which is obtained by a user.

A first motion detection method using background image according to the present invention is a differential motion detection method using background image for deriving an image of a moving object by subtracting a background image from an input image which includes the image of the moving object, the background image being obtained by adding the input image and a previous background image both of which are weighted with variable weighting values, respectively, comprising:

a first step of defining a region in which the moving object exists as a moving object existing region, defining a region in which the moving object does not exist as a background region, and defining a region in which a sudden change occurs in the input image as an input image sudden change region;

a second step of calculating an absolute value at each pixel in an image produced by subtracting the background image from the input image to derive a differential/absolute value image;

a third step of calculating a mean value and a variance at a pixel in the differential/absolute value image from the levels of pixels included in a small region on the differential/absolute value image, the small region having the pixel located at the center thereof;

a fourth step of distinguishing from the calculated mean value and variance of the pixel whether the pixel is included in the moving object existing region, the background region, or the input image sudden change region; and a fifth step of changing a method of updating the background image in accordance with whether the pixel is included in the moving object existing region, the background region, or the input image sudden change region.

A second differential motion detection method using background image according to the present invention is a differential motion detection method using background image for deriving an image of a moving object by subtracting a background image from an input image including the image of the moving object, comprising:

a first step of defining a region in which the moving object exists as a moving object existing region, defining a region in which the moving object does not exist as a background region, and defining a region in which a sudden change occurs in the input image as an input image sudden change region;

a second step of calculating a differential/absolute value which is an absolute value of each pixel in an image produced by subtracting the background image from the input image in order to derive a differential/absolute value image;

a third step of mixing the input image with the background image at a predetermined ratio to preliminarily set integration parameters for updating the background image, the third step preliminarily setting each of the integration parameters to a smaller value as the differential/absolute value is larger when the differential/absolute value of each pixel in the differential/absolute value image is larger than a predetermined threshold value, and preliminarily setting each of the integration parameters to a larger value as the differential/absolute value is smaller when the differential/absolute value of each pixel in the differential/absolute value image is smaller than the predetermined threshold value;

a fourth step of calculating a mean value and a variance of a pixel in the differential/absolute value image from the levels of pixels included in a small region on the differential/absolute value image, the small region having the pixel located at the center thereof;

a fifth step of distinguishing, from the calculated mean value and variance of the pixel, whether the pixel is included in the moving object existing region, the background region, or the input image sudden change region; and a sixth step of changing a method of updating the background image in accordance with whether the pixel is included in the moving object existing region, the background region, or the input image sudden change region, the sixth step newly setting the preliminarily set integration parameters to update the background image only when the pixel is a pixel included in either of the moving object existing region and the input image sudden change region.

In the respective differential motion detection methods using background image according to the present invention, which comprise the steps as described above, a background image is slowly updated in a moving object existing region in an input image, while a background region in the input image is quickly updated. Also, an input image sudden change region is immediately updated, and the entire background image is immediately replaced with the input image when the number of pixels in the input image sudden change region is larger than a predetermined threshold value.

BRIEF DESCRIPTION OF THE DRAWINGS

FIG. 2 shows explanatory diagrams for a method of calculating variances and mean values of a differential/absolute value image;

DESCRIPTION OF THE PREFERRED EMBODIMENTS

Figure 1:
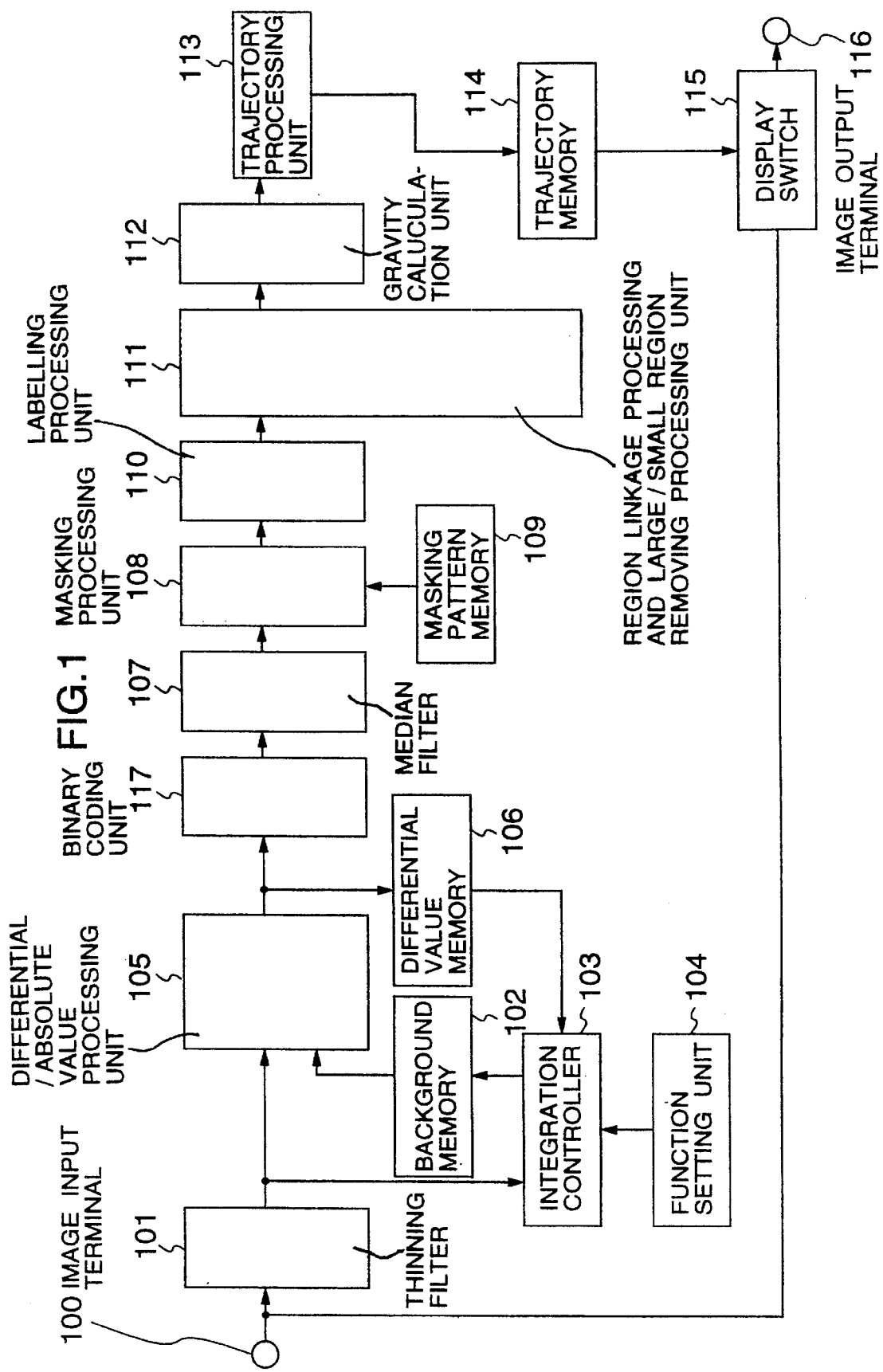
FIG. 1 is a block diagram showing an example of the configuration for implementing the differential motion detection method using background image according to the present invention.

FIG. 1 is a block diagram of a motion detection apparatus for explaining an embodiment of a differential motion detection method using background image according to the present invention. The motion detection apparatus includes an image input terminal 100; a thinning filter 101; a function setting unit 104; an integration controller 103; a background memory 102; a differential/absolute value processing unit 105; a differential value memory 106; a binary coding unit 117; a median filter 107; a masking processing unit 108; a masking pattern memory 109; a labelling processing unit 110; a region linkage processing and large/small region removing processing unit 111; a gravity calculation unit 112; a trajectory processing unit 113; a trajectory memory 114; a display switch 115; and an image output terminal 116.

A two-dimensional input image I(i, j), having passed through a mean value filter (not shown) so as to avoid aliasing, is inputted to the thinning filter 101 via the image input terminal 100. In the thinning filter 101, the input image I(i, j) is thinned by m pixels in the i direction and by n pixels in the j direction to be converted to a processed image. Here, a block consisting of m x n pixels is treated as a processed pixel unit, the level of which is defined to be a mean value of the levels of the respective pixels. By setting the mean value of the levels of the respective pixels to the level of one processed pixel unit, it is possible to reduce fixed noise in each pixel and noise caused by dark current.

The thinning filter 101 also performs thinning of frames since the timing at which a differential is calculated between an input image and a background image is determined by the number of frames. For example, if the timing at which a differential is calculated between the input image and the background image is determined to be five frames, a frame thinning ratio is expressed as "5". It should be noted that the frame thinning ratio is made variable since a moving speed of a moving object is not always fixed and the processing associated with the thinning must be modified in accordance with fluctuations in the moving speed.

The processed image (input image I(i, j)) outputted from the thinning filter 101 is inputted to the integration controller 103, where the processed image is subjected to the integration processing expressed by the aforementioned equation (1) to be converted to a background image B(i, j) which is then stored in the background memory 102. The processed image outputted from the thinning filter 101 is also inputted to the differential/absolute value processing unit 105, where the processed image is subjected to differential/absolute value processing with the background image B(i, j) stored in the background memory 102 to be converted to a differential/absolute value image D(i, j). The differential/absolute value image D(i, j) outputted from the differential/absolute value processing unit 105 is stored in the differential value memory 106 for use in the integration processing expressed by the equation (1) to be executed in the integration controller 103 at the next time.

Figure 3:
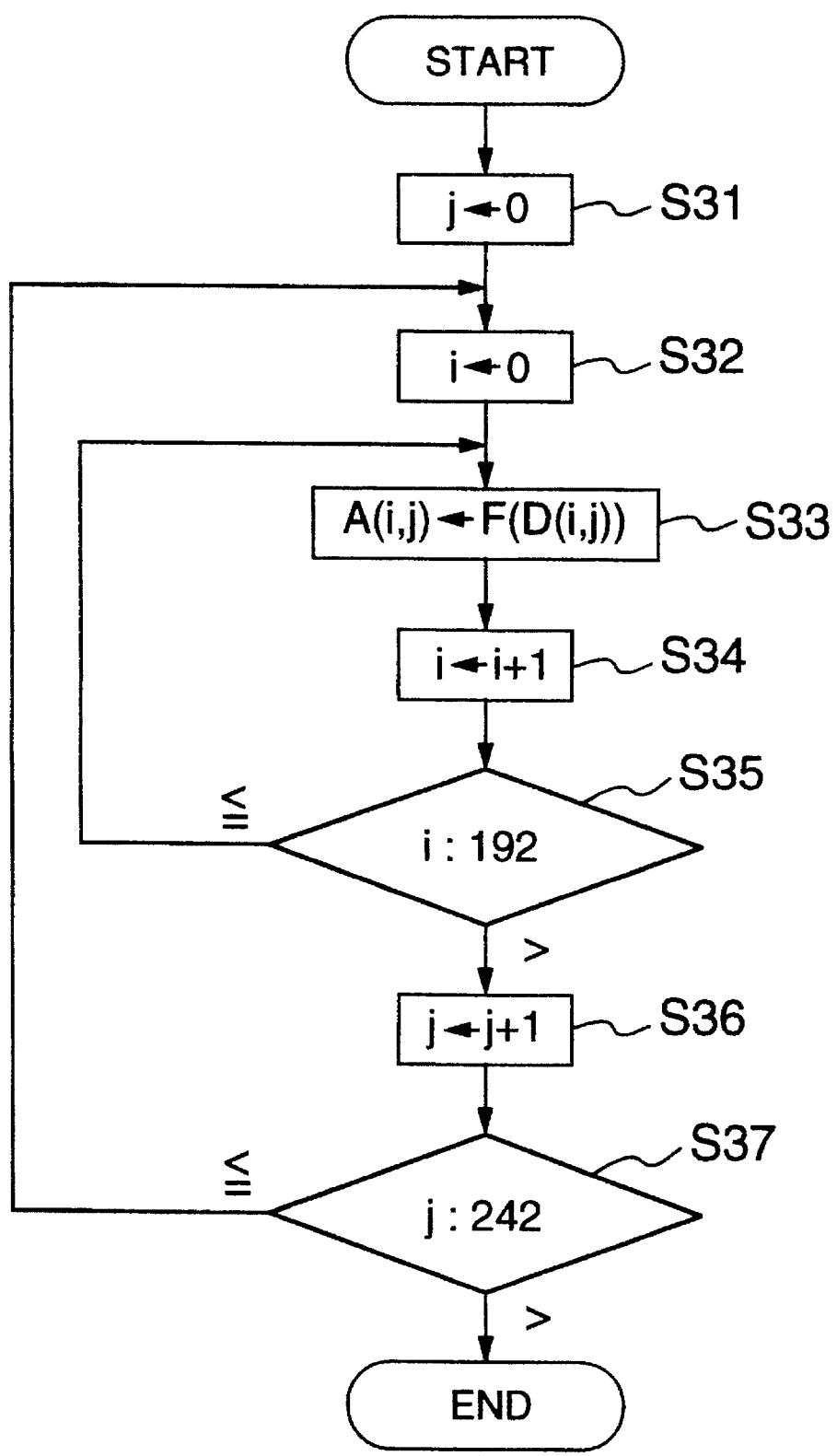
FIG. 3 is a flow chart representing the processing for setting integration parameters from a differential/absolute value image with a fixed function.

The operation for preliminarily determining the integration parameters A(i, j) in the integration controller 103 will be next explained with reference to a flow chart shown in FIG. 3, assuming that the number of pixels in the differential/absolute value image D(i, j) and the size of the integration parameters A(i, j) are selected to be "192" in the i direction and "242" in the j direction. Here, the integration parameters A(i, j) are "preliminarily determined" because they are set again in later processing when a moving object existing region, a background region, and an input image sudden change region are distinguished from each other.

Figure 4:
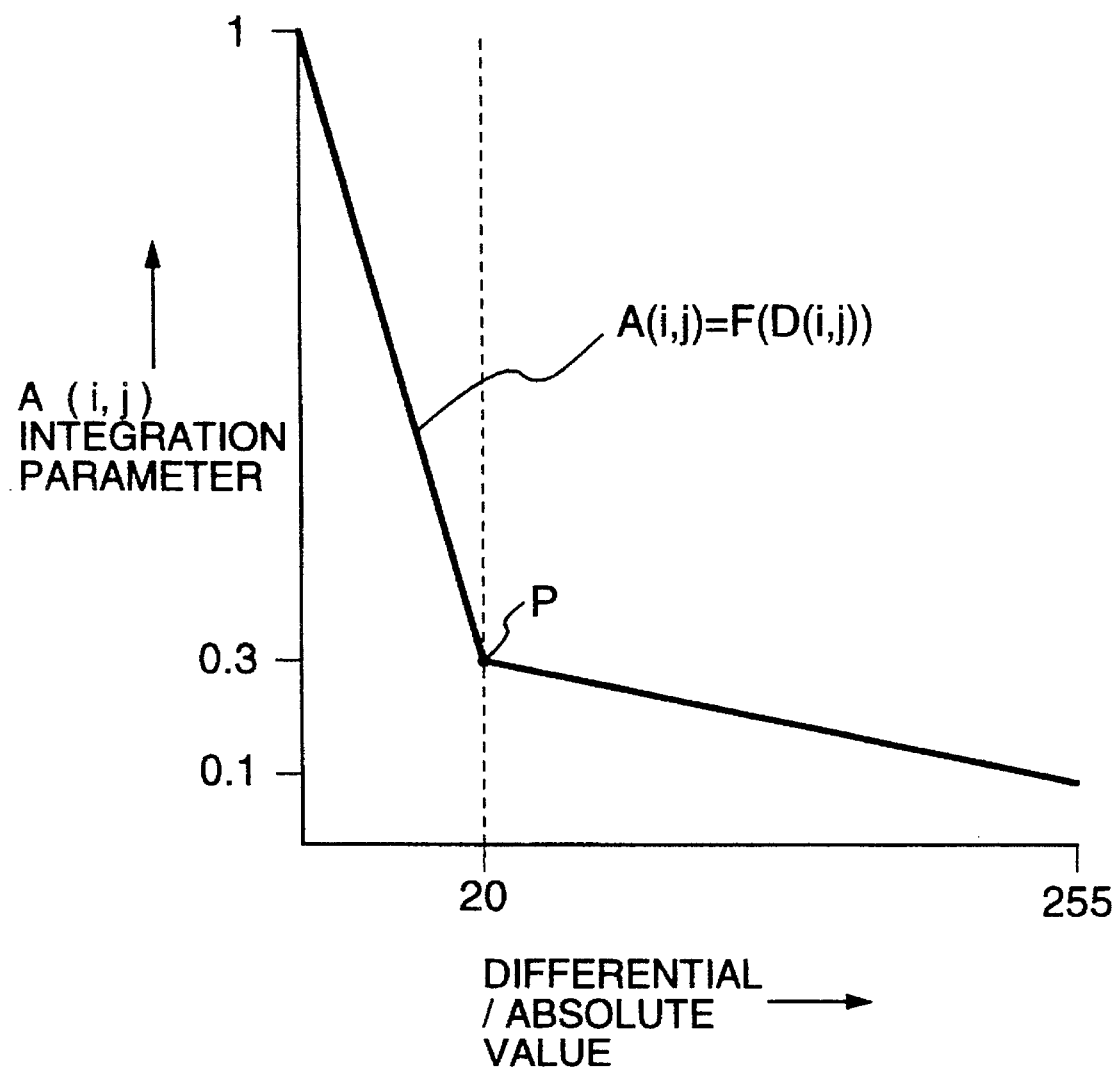
FIG. 4 is a graph showing the characteristic of a fixed function for preliminarily setting the integration parameters.

After clearing the values j, i to "0" (steps S31, S32), an integration parameter A(0,0) is preliminarily determined using a functional equation A(i, j)=F(D(i, j)) shown in FIG. 4 (step S33). Then, the value i is incremented by "1" (step S34), and an integration parameter A(1,0) is preliminarily determined (step S33). The operations at steps S34 and S33 are repeated until i reaches "192" (step S35). Thereafter, the value j is incremented by "1" (step S36), the value i is cleared to "0" (step S32), and an integration parameter A(0, 1) is preliminarily determined in a similar manner (step S33). Then, the value i is incremented by "1" (step S34), and an integration parameter A(1, 1) is preliminarily determined (step S33). The operations at steps S34 and S33 are repeated until i reaches "192" (step S35). Thereafter, the operations from step S36 are repeated until j reaches "242" (step S37). Thus, the number equal to 192×242 of integration parameters A(i, j) are preliminarily determined.

The function F(D(i, j)) shown in FIG. 4 is set by the function setting unit 104 in a central processing unit (CPU). More specifically, the function setting unit 104 receives changes in setting environment around a camera, e.g., indoor, outdoor, and so on, from a manmachine interface such as switches, and selectively modifies the function F(D(i, j)) in accordance with the received changes. The function F(D(i, j)) illustrated in FIG. 4 shows an example of such a function which has been selectively modified in this way. The function F(D(i, j)) preliminarily sets a smaller value to the integration parameter A(i, j) as a differential/absolute value is larger when the differential/absolute value of each pixel in the differential/absolute value image D(i, j) is larger than a predetermine threshold value "20", and sets a larger value to the integration parameter A(i, j) as the differential/absolute value is smaller when the differential/absolute value of each pixel in the differential/absolute value image D(i, j) is smaller than the predetermine threshold value "20". A point P in FIG. 4 indicates a predetermined threshold value (a threshold value for binary coding) and the value of the integration parameter A(i, j) calculated so as not to erroneously detect slow fluctuations in the input image I(i, j).

Subsequently, as shown in FIG. 2, a mean value and a variance of the level at the central pixel in a block consisting of b×b (b is an integer) pixels on the differential/absolute value image D(i, j) consisting of m×n pixels are calculated from mean values and variances of the levels at all pixels in this block to newly set the integration parameters A(i, j). Then, the integration processing expressed by the equation (1) is executed by the integration controller 103 using the newly set integration parameters A(i, j) in the above-mentioned manner, the background image B(i, j) is produced and stored in the background memory 102.

Figure 5:
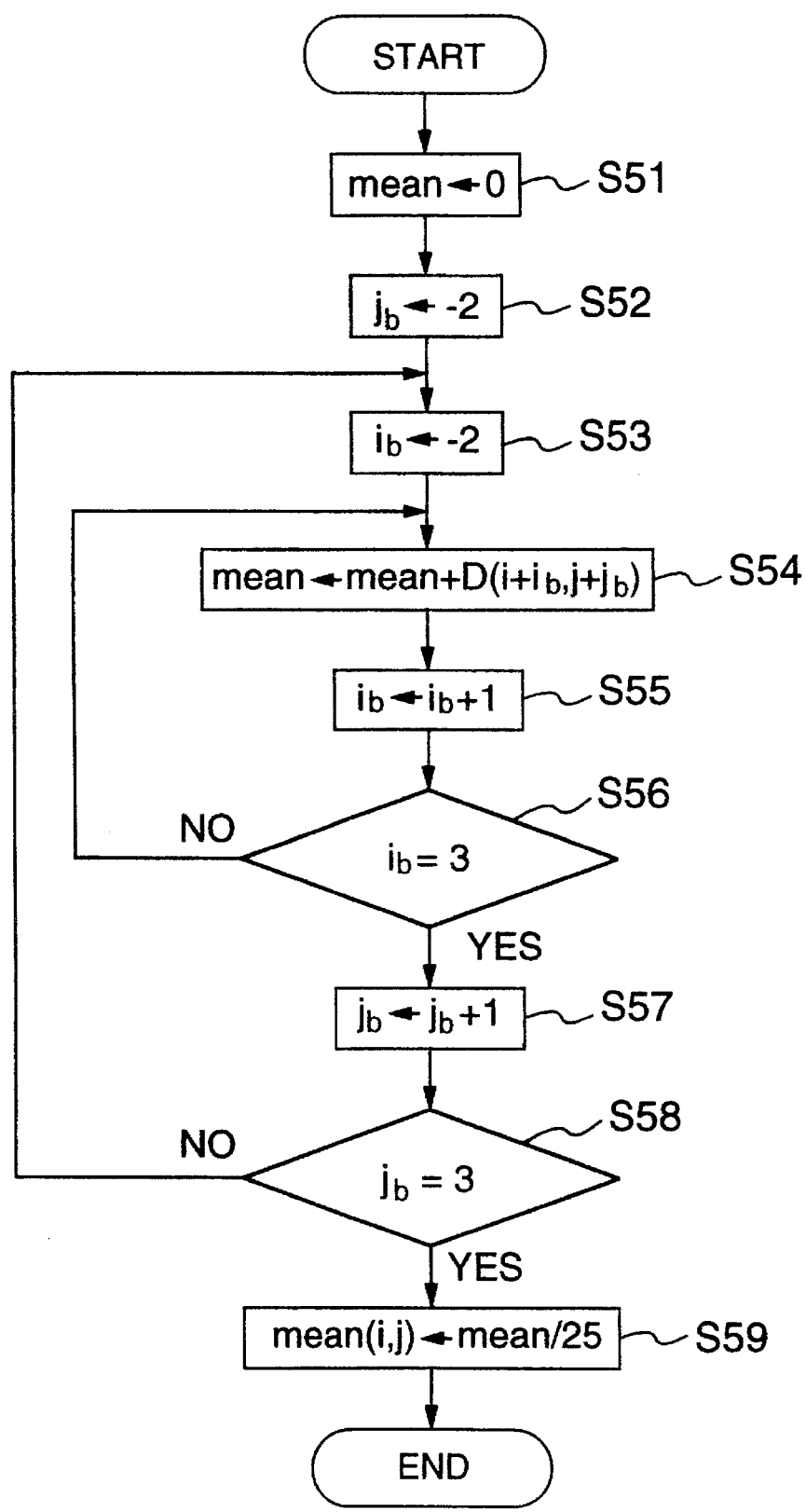
FIG. 5 is a flow chart representing the processing for calculating a mean value of a differential/absolute value image.
Figure 6:
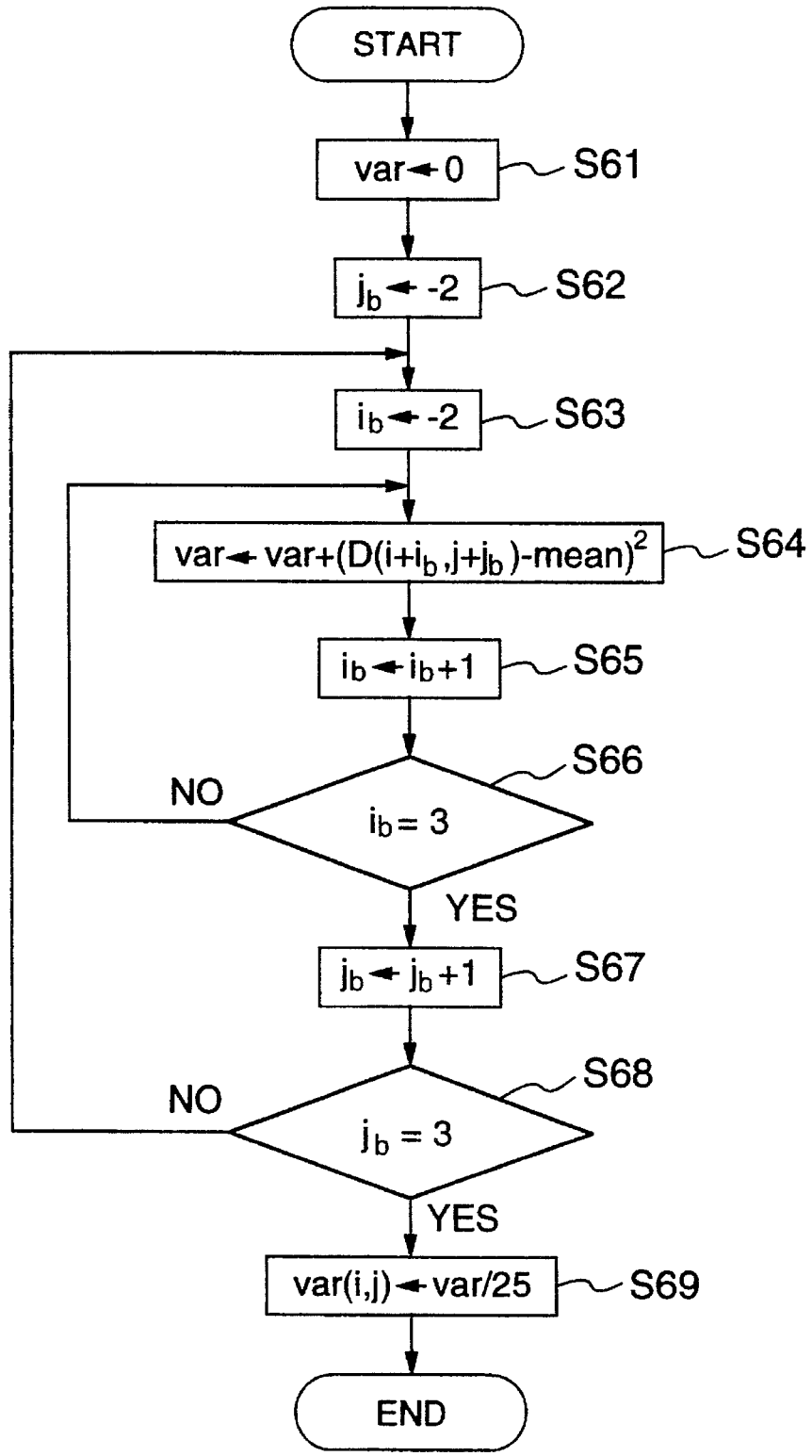
FIG. 6 is a flow chart representing the processing for calculating a variance of the differential/absolute value image.

Next, an example of a method of calculating a mean value and a variance of the level at the central pixel in each block will be explained with reference to flow charts shown in FIGS. 5 and 6. It is assumed herein that the central pixel in a block (small region) consisting of 5×5 pixels in the differential/absolute value image D(i, j) consisting of 192× 242 pixels is designated D(i, j), and each pixel in the block is represented by D(i+$i_b$, j+$j_b$)($i_b$=−2~2, $j_b$=−2~2).

First, a method of calculating a mean value will be explained with reference to the flow chart shown in FIG. 5. A mean value "mean" is initially cleared to "0" (step S51). Next, the value $j_b$ is set to "−2" (step S52), the value ib is also set to "−2" (step S53), and the level at a pixel D(i−2, j−2) is calculated and defined as the mean value "mean" (step S54). Then, after the value ib is incremented by "1" (step S55) and the level at a pixel D(i−1, j−2) is calculated, this level is added to the previously calculated mean value "mean" to derive a new mean value "mean" (step S54). The operations at steps S55 and S54 are repeated until the value ib reaches "2" (step S56). Thereafter, the value $j_b$ is incremented by "1" (step S57), and the operations from step S53 to step S56 are repeated. The operations from step S57 are repeated until the value $j_b$ reaches "2" (step S58). Since the mean value "mean" derived by the foregoing operations is the sum of the levels at the respective pixels D(i+$j_b$, j+$j_b$)($i_b$= −2~2, $j_b$=−2~2) in the block consisting of 5×5 pixels, the derived mean value "mean" is divided by "25" to obtain a mean value mean(i, j) at the central pixel D(i, j) in the block consisting of 5×5 pixels (step S59).

The reason why the derived mean value "mean" is divided by "25" is to obtain the mean value of 5×5 pixels. Thus, when the mean value of 8×8 pixels is obtained, the derived mean value "mean" is divided by "64".

Next, a method of calculating a variance will be explained with reference to the flow chart shown in FIG. 6. First, a variance "var" is cleared to "0" (step S61). Next, the value $j_b$ is set to "−2" (step S62), the value ib is also set to "−2"

(step S63), and a square of the difference between the level at a pixel D(i−2, j−2) and the mean value "mean" is calculated to derive the variance "vat" (step S64). Then, after the value $i_b$ is incremented by "1" (step S65) and a square of the difference between the level at a pixel D(i−1, j−2) and the mean value "mean" is calculated, this calculated value is added to the previously calculated variance "vat" to derive a new variance "vat" (step S64). The operations at steps S65 and S64 are repeated until the value $i_b$ reaches "2" (step S66). Thereafter, the value $j_b$ is incremented by "1" (step S67), and the operations from step S63 to step S66 are repeated. The operations from step S67 are repeated until the value $j_b$ reaches "2" (step S68). The variance "var" derived by the foregoing operations is divided by "25" to obtain a variance var(i, j) at the central pixel D(i, j) in the block consisting of 5×5 pixels (step S69).

The reason why the derived variance "var" is divided by "25" is to obtain the variance of 5×5 pixels. Thus, when the variance of 8×8 pixels is obtained, the derived variance "var" is divided by "64".

The mean value mean(i,j) and variance vat(i,j) calculated by the above operations are expressed by the following equations (2) and (3):

$$\text{mean}(i, j) = \frac{1}{25} \sum_{i_b=-2}^{+2} \sum_{j_b=-2}^{+2} (D(i + i_b, j + j_b)) \quad (2)$$

$$\text{var}(i, j) = \frac{1}{25} \sum_{i_b=-2}^{+2} \sum_{j_b=-2}^{+2} (D(i + i_b, j + j_b) - \text{mean})^2 \quad (3)$$

By thus deriving the mean value mean(i, j) and variance vat(i, j) for each pixel in the differential/absolute value image D(i, j), it is possible to realize the distinction of a moving object existing region, a background region, and an input image sudden change region from an input image and a background image, which is associated with the items (a) and (b) within the four items (a)–(d) constituting the object of the present invention. This is because the three regions have inherent characteristics different from each other: a large variance is present in the moving object existing region in which a moving object exists, a small mean value and variance are present in the background region, and a large mean value and a small variance are present in the input image sudden change region.

Incidentally, when the background is dark and presents a small reflectivity, the mean value of pixels in a differential/absolute value image D(i, j) is not large. However, in this case, since the integration parameters A(i, j), which indicate a degree of update to the background, are set sufficiently large as shown in FIG. 4, the update to the background follows sufficiently to prevent erroneous detection, thus causing no problem.

Next, an example of the operations for dividing mean values mean(i, j) into two with a predetermined threshold value mth, also dividing variances var(i, j) into two with a predetermined threshold value $v_{th}$, classifying an image into a moving object existing region, a back ground region, and an input image sudden change region, and setting the integration parameter A(i, j) to each pixel in these regions, utilizing the above-mentioned characteristics, will be explained with reference to a flow chart shown in FIG. 7. As is indicated by the equation (1), the degree of replacing a background image with an input image is larger as the value of the integration parameter A(i, j) is larger, and the value of the integration parameter A(i, j) equal to "1" indicates that the background image is entirely replaced with the input image. Such processing means that a larger value is set to the integration parameter A(i, j) in the order of the moving object existing region, the background region, and the input image sudden change region.

Figure 7:
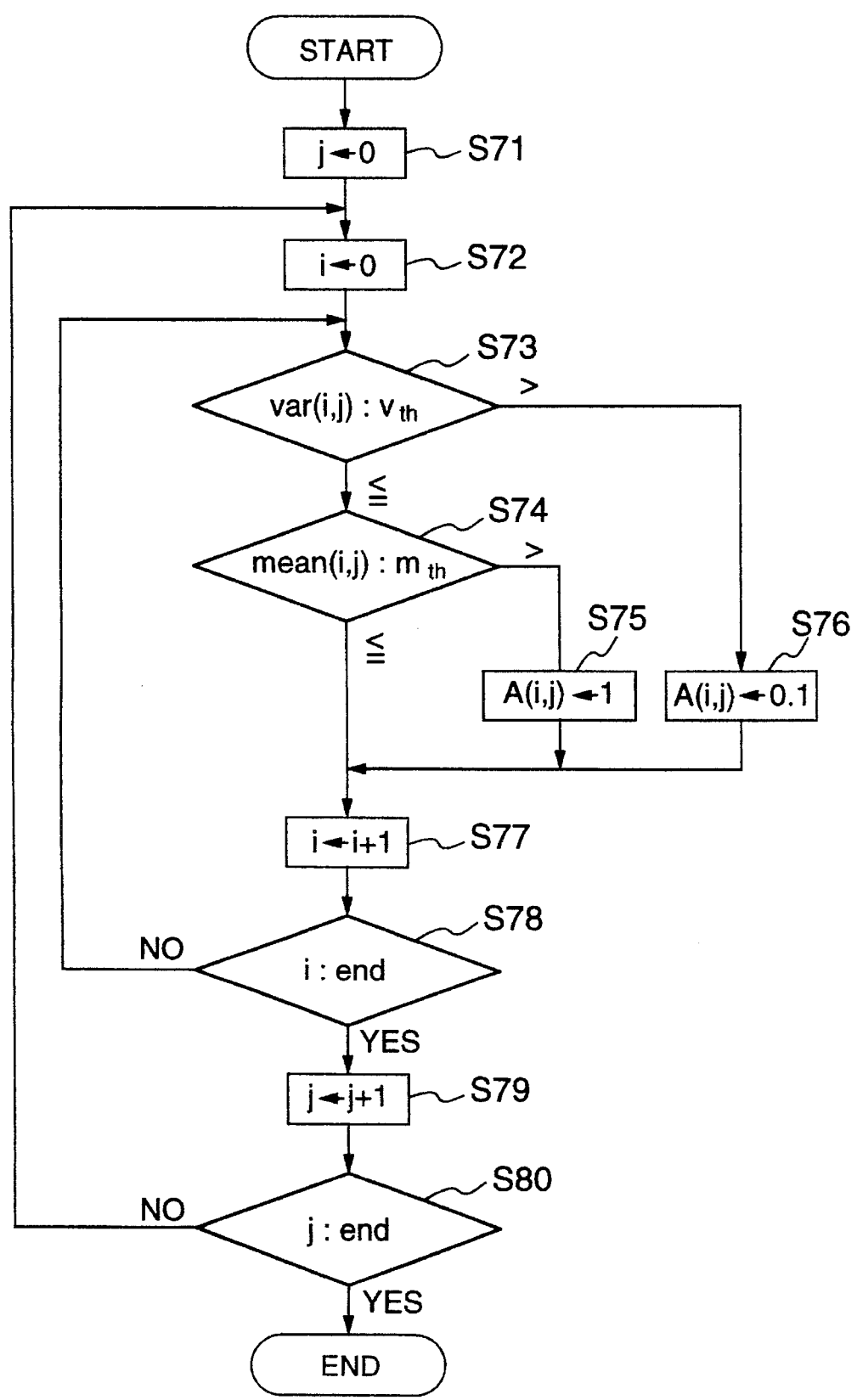
FIG. 7 is a flow chart representing the processing for setting the integration parameters from the variances and mean values of the differential/absolute value image.

Now, referring specifically to FIG. 7, first, the value j and the value i are cleared to "0" (steps S71, S72). Then, a variance var(0, 0) is compared with the threshold value $v_{th}$ (step S73). If the variance var(0, 0) is larger than the threshold value $v_{th}$, an integration parameter A(0, 0) is set to "0.1", determining that a moving object existing region is associated (step S76), thus setting the degree of replacing the background image with the input image to be small. On the other hand, if the variance vat(0, 0) is smaller than the threshold value $v_{th}$ at step S73, the mean value mean(0, 0) is compared with the threshold value $m_{th}$ (step S74). If the mean value mean(0, 0) is larger than the threshold value mth, the integration parameter A(0, 0) is set to "1", determining that an input image sudden change region is associated (step S75), thus setting the degree of replacing the background image with the input image to be large. On the other hand, if the mean value mean(0, 0) is smaller than the threshold value mth at step S74, the integration parameter A(0, 0) is set to the value of the function F(D(i, j)) shown in FIG. 4 as it is, determining that a background region is associated.

Thereafter, the value i is incremented by "1" (step S77), and the operations from step S73 to step S76 are repeated to set the value of an integration parameter A(1, 0). These operations are repeated until the value i reaches an end value (step S78).

Then, the value j is incremented by "1" (step S79), and the operations from step S72 to step S78 are repeated to set the value of an integration parameter A(i, 1). These operations are repeated until the value j reaches an end value (step S80).

With the operations described above, the values of the integration parameters A(i, j) are all set. Since this allows the background image to be quickly replaced with the input image in the input image sudden change region, and a quite small amount of the background image to be replaced with the input image in the moving object existing region, the background image can be updated so as to avoid influences by a moving object entering the input image. Thus, by setting the values of the integration parameters A(i, j) in the foregoing manner, the item (c) within the four items (a)–(d) constituting the object of the present invention can be realized.

Figure 8:
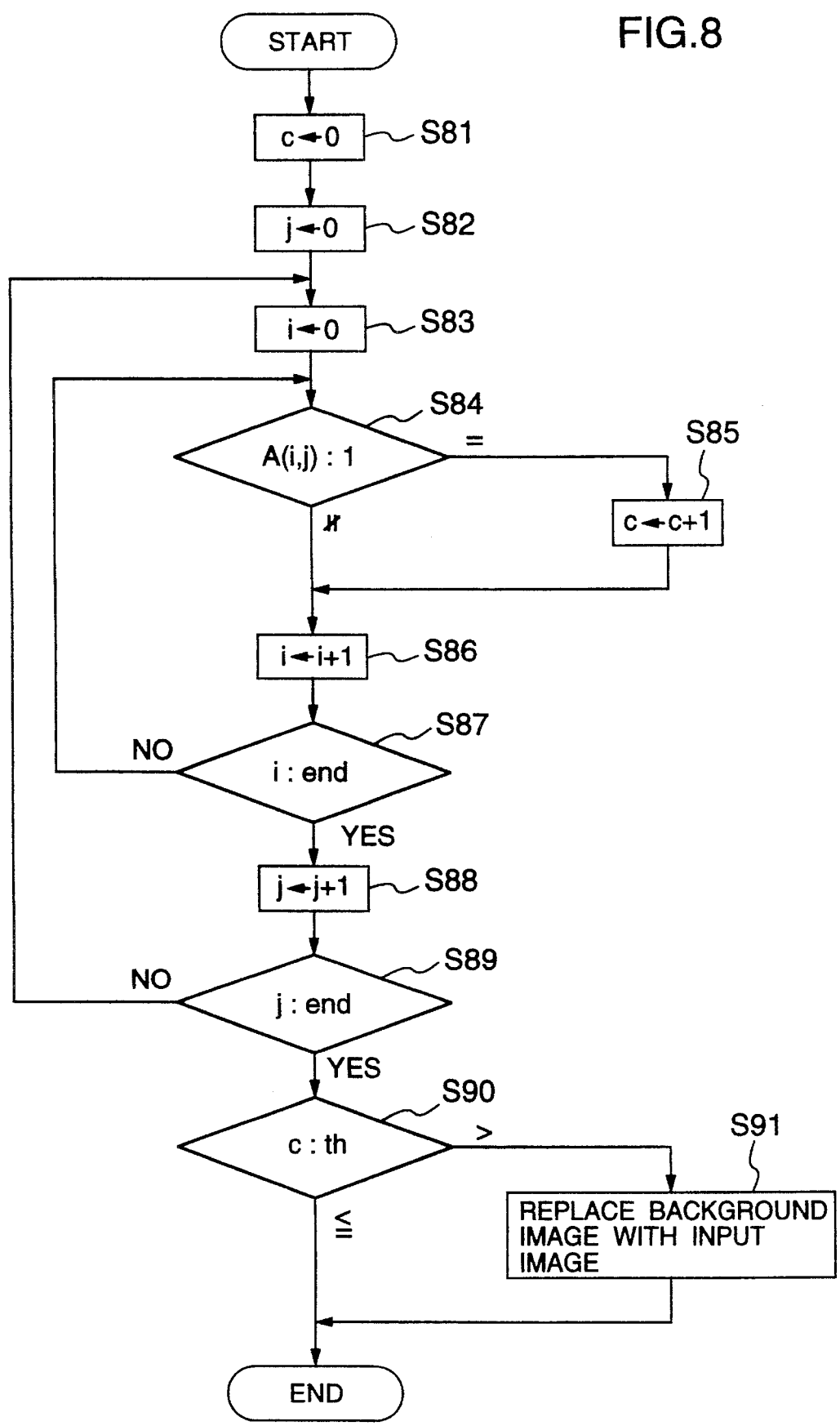
FIG. 8 is a flow chart representing the processing for counting the number of regions in which a sudden change is occurring in a background and replacing a background image with an input image.

Next, a processing method performed when a number of input image sudden change regions have occurred on an input image will be explained with reference to FIG. 8. A count value c of a counter (not shown) for counting the number of times each of the integration parameters A(i, j) is set to "1" is cleared to "0" (step S81). Then, the value j and the value i are also cleared to "0" (steps S82, S83). Subsequently, it is determined whether or not the value of the integration parameter A(0, 0) is equal to "1" (step S84). If the value of the integration parameter A(0, 0) is equal to "1" the count value c is incremented by "1" (step S85). Then, after the value i is incremented by "1" (step S86), the operations at steps S84 and S85 are repeated until the value i reaches an end value (step S87). Next, after the value j is incremented by "1" (step S88), the operations from step S83 to step S88 are repeated until the value j reaches an end value (step S89).

When the number of times the value is set to "1" has been counted for all the integration parameters A(i, j) in the foregoing manner, the final count value c is compared with a predetermined threshold value th (step S90). If the final count value c is larger than the threshold value th, the background image is entirely replaced with the input image (step S91).

In this way, even if a sudden change occurs in an input image due to lightening, switching on or off of illumination, or the like, the image processing can be continued only after the images so far processed are deleted and the entire screen of the background image is replaced with the input image.

Since a combination of the foregoing operation and the above-mentioned replacement processing in an input image sudden change region enables updating of the background image so as not to erroneously detect sudden changes in the input image, the item (d) within the four items (a)–(d) constituting the object of the present invention can be realized.

It should be noted that the integration parameter $A(i, j)$ may be set to a value of approximately "1" at step S75 shown in FIG. 7 instead of "1". Also, at step S76, the integration parameter $A(i, j)$ may be set to "0" or approximately "0" instead of "0.1" so that the background image is not updated.

In the differential/absolute value processing unit 105 shown in FIG. 1, after a differential between an input image $I(i, j)$ and a background image $B(i, j)$ is calculated, an absolute value of the differential is derived to create a differential/absolute value image $D(i, j)$. Further, since moving objects are thought to often include a number of edges, processing for adding horizontal and vertical gradients to the differential/absolute value image $D(i, j)$ is also performed.

The differential/absolute value image $D(i, j)$ outputted from the differential/absolute value processing unit 105 is inputted to the binary coding unit 117 and subjected to binary coding, whereby the differential/absolute value image $D(i, j)$ is converted to a binary coded image. The binary coded image outputted from the binary coding unit 117 is inputted to a M×M binary coded median filter 107, where the binary coded image is passed through a $M^2/2$ median filter. This results in producing effects of removing noise and absorbing non-uniformity of the surface in a detected region of a moving object by adjustment of the size.

The latter effect will be described in greater detail. The size of a moving object on a processed image is determined from the distance between a camera and the object, the actual size of the moving object, spatial thinning ratio m'n, the focal length of a used lens, and the number of pixels and aspect ratio of a used CCD (Change Coupled Device). If the respective information is provided, the size of the median filter 107 may be determined based on the size of the moving object.

The processed result by the median filter 107 is next subjected to masking processing in the masking processing unit 108 with a predetermined masking pattern stored in the masking pattern memory 109 to limit processed regions in a processed image. The resulting processed image is next subjected to labelling processing in the labelling processing unit 110. Each labelled label is then subjected to processing in the region linkage processing and large/small region removing processing unit 111. This processing is such that the sizes of detected regions are compared with a previously inputted range for acceptable sizes of moving objects, and regions which do not fall under the range are removed. It is therefore possible to remove noise components of sizes apparently different from an object to be detected such as rain, snow, a dog, a cat, or the like from an input image.

Each of the labels remaining after the region linkage processing and large/small region removal processing was performed next undergoes a gravity calculation in the gravity calculation unit 112. Then, a trajectory of the gravity of each label is traced by the trajectory processing unit 113, and the trajectory is stored in the trajectory memory 114. The trajectory is outputted from the image output terminal 116 through the display switch 115 and displayed on a display unit, not shown.

According to the differential motion detection method using background image of the present invention as described above, a moving object can be favorably detected without deformation of a detected region. Also, since a background region is distinguished from a moving object existing region and a background updating method is appropriately changed, a background can be produced in a high accuracy. Also, the detection of an input image sudden change region and control of background image update enable detection of a moving object to be resistant to a sudden change in an input image.

What is claimed is:

1. A differential motion detection method using background image for deriving an image of a moving object by subtracting a background image from an input image which includes said image of the moving object, said background image being obtained by adding the input image and a previous background image both of which are weighted with variable weighting values, respectively, comprising:

a first step of defining a region in which said moving object exists as a moving object existing region, defining a region in which said moving object does not exist as a background region, and defining a region in which a sudden change occurs in said input image as an input image sudden change region;

a second step of calculating an absolute value at each pixel in an image produced by subtracting said background image from said input image in order to derive a differential/absolute value image;

a third step of calculating a mean value and a variance at a pixel in said differential/absolute value image from the levels of pixels included in a small region on said differential/absolute value image, said small region having said pixel located at the center thereof;

a fourth step of distinguishing, from said calculated mean value and variance of said pixel, whether said pixel is included in said moving object existing region, said background region, or said input image sudden change region; and a fifth step of changing a method of updating said background image in accordance with whether said pixel is included in said moving object existing region, said background region, or said input image sudden change region.

2. A differential motion detection method using background image according to claim 1, wherein said fifth step includes a step of updating said background image, using said input image and said background image, by setting a smaller degree of replacing said background image with said input image when said pixel is a pixel included in said moving object existing region and by setting a larger degree of replacing said background image with said input image when said pixel is a pixel included in said input image sudden change region.

3. A differential motion detection method using background image according to claim 2, wherein:

said fourth step includes a step of counting the number of times said pixel is determined to be a pixel included in said input image sudden change region; and said fifth step includes a step of updating said background image by replacing said background image with said input image or by setting a larger degree of replacing said background image with said input image when said number of times exceeds a predetermined value.

4. A differential motion detection method using background image for deriving an image of a moving object by subtracting a background image from an input image including said image of the moving object, comprising:

a first step of defining a region in which said moving object exists as a moving object existing region, defining a region in which said moving object does not exist as a background region, and defining a region in which a sudden change occurs in said input image as an input image sudden change region;

a second step of calculating a differential/absolute value which is an absolute value of each pixel in an image produced by subtracting said background image from said input image in order to derive a differential/absolute value image;

a third step of mixing said input image with said background image at a predetermined ratio to preliminarily set integration parameters for updating said background image, said third step preliminarily setting each of said integration parameters to a smaller value as said differential/absolute value is larger when said differential/absolute value of each pixel in said differential/absolute value image is larger than a predetermined threshold value, and preliminarily setting each of said integration parameters to a larger value as said differential/absolute value is smaller when said differential/absolute value of each pixel in said differential/absolute value image is smaller than the predetermined threshold value;

a fourth step of calculating a mean value and a variance of a pixel in said differential/absolute value image from the levels of pixels included in a small region on said differential/absolute value image, said small region having said pixel located at the center thereof;

a fifth step of distinguishing, from said calculated mean value and variance of said pixel, whether said pixel is included in said moving object existing region, said background region, or said input image sudden change region; and a sixth step of changing a method of updating said background image in accordance with whether said pixel is included in said moving object existing region, said background region, or said input image sudden change region, said sixth step newly setting said preliminarily set integration parameters to update said background image only when said pixel is a pixel included in either of said moving object existing region and said input image sudden change region.

5. A differential motion detection method using background image according to claim 4, wherein said sixth step includes a step of newly setting said preliminarily set integration parameters such that a degree of replacing said background image with said input image is made smaller when said pixel is a pixel included in said moving image existing region, and newly setting said preliminarily set integration parameters such that the degree of replacing said background image with said input image is made larger when said pixel is a pixel included in said input image sudden change region.

* * * * *